United States Patent
Haramaty et al.

(10) Patent No.: US 9,325,641 B2
(45) Date of Patent: Apr. 26, 2016

(54) BUFFERING SCHEMES FOR COMMUNICATION OVER LONG HAUL LINKS

(71) Applicant: Mellanox Technologies Ltd., Yokneam (IL)

(72) Inventors: Zachy Haramaty, Hemed (IL); Noam Katz Abramovich, Tel Aviv (IL); George Elias, Tel Aviv (IL); Ido Bukspan, Herzliya (IL); Benny Koren, Zichron Yaakov (IL); Gil Bloch, Zichron Yaakov (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 78 days.

(21) Appl. No.: 14/207,680

(22) Filed: Mar. 13, 2014

(65) Prior Publication Data

US 2015/0263994 A1    Sep. 17, 2015

(51) Int. Cl.
*H04L 12/861* (2013.01)
*H04L 12/801* (2013.01)
*H04L 12/803* (2013.01)

(52) U.S. Cl.
CPC .............. *H04L 49/90* (2013.01); *H04L 47/115* (2013.01); *H04L 47/122* (2013.01); *H04L 47/18* (2013.01)

(58) Field of Classification Search
CPC ....................................... H04L 49/90
USPC .................................. 370/412, 232, 233, 234
See application file for complete search history.

(56) References Cited

U.S. PATENT DOCUMENTS

| | | | |
|---|---|---|---|
| 5,367,520 A | 11/1994 | Cordell | |
| 5,574,885 A | 11/1996 | Denzel et al. | |
| 5,790,522 A * | 8/1998 | Fichou | H04L 12/5602 370/236 |
| 5,917,947 A * | 6/1999 | Ishida | H04N 1/00204 382/232 |
| 6,160,814 A * | 12/2000 | Ren | H04L 12/5601 370/427 |
| 6,169,748 B1 | 1/2001 | Barbas et al. | |
| 6,324,165 B1 * | 11/2001 | Fan | H04L 12/5602 370/232 |
| 6,347,337 B1 | 2/2002 | Shah et al. | |
| 6,456,590 B1 | 9/2002 | Ren et al. | |
| 6,490,248 B1 | 12/2002 | Shimojo | |
| 6,535,963 B1 | 3/2003 | Rivers | |
| 6,539,024 B1 | 3/2003 | Janoska et al. | |
| 6,606,666 B1 | 8/2003 | Clark et al. | |
| 6,633,395 B1 * | 10/2003 | Tuchitoi | G06F 3/1212 358/1.14 |

(Continued)

FOREIGN PATENT DOCUMENTS

EP    1698976 A1    9/2006
WO    03024033 A1    3/2003

OTHER PUBLICATIONS

U.S. Appl. No. 12/876,265 Office Action dated May 1, 2013.

(Continued)

*Primary Examiner* — Parth Patel
(74) *Attorney, Agent, or Firm* — D. Kligler I.P. Services Ltd.

(57) ABSTRACT

A switching apparatus includes multiple ports, each including a respective buffer, and a switch controller. The switch controller is configured to concatenate the buffers of at least an input port and an output port selected from among the multiple ports for buffering traffic of a long-haul link, which is connected to the input port and whose delay exceeds buffering capacity of the buffer of the input port alone, and to carry out end-to-end flow control for the long haul link between the output port and the input port.

18 Claims, 4 Drawing Sheets

(56) References Cited

U.S. PATENT DOCUMENTS

| | | | |
|---|---|---|---|
| 6,771,654 B1* | 8/2004 | Sang | H04L 12/42 370/376 |
| 6,895,015 B1 | 5/2005 | Chiang et al. | |
| 6,922,408 B2 | 7/2005 | Bloch et al. | |
| 6,993,032 B1 | 1/2006 | Dammann et al. | |
| 7,027,457 B1* | 4/2006 | Chiussi | H04L 47/11 370/414 |
| 7,068,822 B2 | 6/2006 | Scott | |
| 7,088,713 B2 | 8/2006 | Battle et al. | |
| 7,131,125 B2 | 10/2006 | Modelski et al. | |
| 7,136,381 B2 | 11/2006 | Battle et al. | |
| 7,190,667 B2 | 3/2007 | Susnow et al. | |
| 7,327,749 B1 | 2/2008 | Mott | |
| 7,334,065 B1* | 2/2008 | Rose | G06F 13/385 370/372 |
| 7,590,058 B1 | 9/2009 | Cherchali et al. | |
| 7,609,636 B1 | 10/2009 | Mott | |
| 7,747,086 B1* | 6/2010 | Hobbs | G06T 9/004 382/232 |
| 7,773,622 B2 | 8/2010 | Schmidt et al. | |
| 7,853,738 B2 | 12/2010 | Pothireddy et al. | |
| 7,856,026 B1* | 12/2010 | Finan | H04L 49/103 370/412 |
| 7,924,708 B2 | 4/2011 | Spink | |
| 7,936,770 B1 | 5/2011 | Frattura et al. | |
| 8,149,710 B2 | 4/2012 | Bergamasco et al. | |
| 8,270,295 B2 | 9/2012 | Kendall et al. | |
| 8,274,971 B2 | 9/2012 | Battle et al. | |
| 8,352,648 B1* | 1/2013 | Puranik | G06F 13/38 710/36 |
| 8,478,811 B2 | 7/2013 | Garg et al. | |
| 8,635,386 B2 | 1/2014 | Takahashi | |
| 8,656,188 B2 | 2/2014 | Goodwill et al. | |
| 8,699,491 B2 | 4/2014 | Koren et al. | |
| 8,923,337 B2* | 12/2014 | Singh | H04L 12/6418 370/476 |
| 2002/0012340 A1 | 1/2002 | Kalkunte et al. | |
| 2002/0019916 A1* | 2/2002 | Henrion | H04Q 11/0478 711/159 |
| 2002/0027908 A1 | 3/2002 | Kalkunte et al. | |
| 2002/0067695 A1* | 6/2002 | Skarpness | H04Q 11/0478 370/230.1 |
| 2002/0167955 A1* | 11/2002 | Shimojo | H04L 12/5601 370/411 |
| 2002/0176432 A1* | 11/2002 | Courtney | H04J 3/062 370/415 |
| 2003/0016697 A1* | 1/2003 | Jordan | H04J 3/1617 370/466 |
| 2003/0043828 A1* | 3/2003 | Wang | H04L 12/5601 370/412 |
| 2003/0048792 A1 | 3/2003 | Xu et al. | |
| 2003/0076849 A1 | 4/2003 | Morgan et al. | |
| 2003/0095560 A1 | 5/2003 | Arita et al. | |
| 2003/0117958 A1 | 6/2003 | Nation et al. | |
| 2003/0118016 A1 | 6/2003 | Kalkunte et al. | |
| 2003/0120894 A1* | 6/2003 | Wang | H04L 49/103 711/220 |
| 2003/0123392 A1* | 7/2003 | Ruutu | H04L 47/762 370/235 |
| 2003/0137939 A1 | 7/2003 | Dunning et al. | |
| 2003/0198231 A1 | 10/2003 | Kalkunte et al. | |
| 2003/0198241 A1 | 10/2003 | Putcha et al. | |
| 2003/0200330 A1 | 10/2003 | Oelke et al. | |
| 2003/0222860 A1* | 12/2003 | Yamaura | G06T 1/60 345/204 |
| 2003/0223435 A1* | 12/2003 | Gil | H04L 12/5602 370/400 |
| 2004/0037558 A1* | 2/2004 | Beshai | H04Q 11/0005 398/57 |
| 2004/0066785 A1 | 4/2004 | He et al. | |
| 2004/0202169 A1* | 10/2004 | Mukouyama | H04L 12/5601 370/395.1 |
| 2005/0063370 A1* | 3/2005 | Beshai | H04Q 11/0005 370/360 |
| 2005/0129033 A1* | 6/2005 | Gordy | H04L 43/026 370/401 |
| 2005/0135356 A1 | 6/2005 | Muthukrishnan et al. | |
| 2005/0259574 A1* | 11/2005 | Figueira | H04L 49/30 370/229 |
| 2006/0034172 A1 | 2/2006 | Morton | |
| 2006/0092842 A1 | 5/2006 | Beukema et al. | |
| 2006/0095609 A1* | 5/2006 | Radhakrishnan | G06F 13/1631 710/52 |
| 2006/0155938 A1 | 7/2006 | Cummings et al. | |
| 2006/0182112 A1 | 8/2006 | Battle et al. | |
| 2007/0015525 A1* | 1/2007 | Beming | H04L 12/5695 455/509 |
| 2007/0019553 A1* | 1/2007 | Sagfors | H04L 29/06027 370/236 |
| 2007/0025242 A1 | 2/2007 | Tsang | |
| 2007/0053350 A1 | 3/2007 | Spink et al. | |
| 2007/0274215 A1* | 11/2007 | Gusat | H04L 1/1874 370/235 |
| 2008/0259936 A1 | 10/2008 | Hussain et al. | |
| 2009/0003212 A1 | 1/2009 | Kwan et al. | |
| 2009/0010162 A1 | 1/2009 | Bergamasco et al. | |
| 2009/0161684 A1 | 6/2009 | Voruganti et al. | |
| 2010/0057953 A1* | 3/2010 | Kim | G06F 13/409 710/52 |
| 2010/0088756 A1 | 4/2010 | Balakrishnan et al. | |
| 2010/0100670 A1 | 4/2010 | Jeddeloh | |
| 2010/0325318 A1 | 12/2010 | Desoli et al. | |
| 2011/0058571 A1 | 3/2011 | Bloch et al. | |
| 2012/0072635 A1* | 3/2012 | Yoshida | H04L 49/3027 710/306 |
| 2012/0106562 A1* | 5/2012 | Laor | H04L 49/10 370/401 |
| 2012/0144064 A1* | 6/2012 | Parker | H04L 45/04 709/241 |
| 2013/0212296 A1 | 8/2013 | Goel et al. | |
| 2014/0036930 A1 | 2/2014 | Lih et al. | |
| 2014/0095745 A1* | 4/2014 | Kawahara | G06F 5/065 710/53 |
| 2014/0204742 A1* | 7/2014 | Pandit | H04L 47/263 370/231 |
| 2014/0286349 A1* | 9/2014 | Kitada | H04L 47/527 370/412 |
| 2014/0289568 A1* | 9/2014 | Koyama | G06K 9/00 714/39 |
| 2014/0310354 A1* | 10/2014 | Fountain | H04L 12/4641 709/204 |
| 2015/0026309 A1* | 1/2015 | Radcliffe | H04L 65/602 709/219 |
| 2015/0058857 A1* | 2/2015 | Sandstrom | G06F 9/54 718/103 |
| 2015/0103667 A1* | 4/2015 | Elias | H04L 41/00 370/236 |

OTHER PUBLICATIONS

Raatikainen, P., "ATM Switches—Switching Technology S38.3165", Switching Technology, L8-1, 34 pages, year 2006 (http://www.netlab.hut.fi/opetus/s383165).

Fahmy, S., "A Survey of ATM Switching Techniques", Department of Computer and Information Science, The Ohio State University, USA, 22 pages, Aug. 21, 1995 (http://www.cs.purdue.edu/homes/fahmy/cis788.08Q/atmswitch.html).

U.S. Appl. No. 13/189,593 Office Action dated Jul. 9, 2013.

Minkenberg et al., "Multistage Interconnection Networks for Data Centers; Bidirectional Fat Tree Construction and Routing for IEEE 802.1au", IBM Research GmbH, Zurich, Switzerland, 9 pages, Jul. 2, 2007.

Infiniband Architecture Release 1.2.1, vol. 1, General specifications, Chapter 7.9, pp. 212-216, Nov. 2007.

Ravid et al., U.S. Appl. No. 13/802,926, filed Mar. 14, 2013.

U.S. Appl. No. 14/813,142 Office Action dated Nov. 5, 2015.

* cited by examiner

BUFFERING SCHEMES FOR COMMUNICATION OVER LONG HAUL LINKS

FIELD OF THE INVENTION

The present invention relates generally to communication networks, and particularly to methods and systems for buffering data of long haul links.

BACKGROUND OF THE INVENTION

In some data communication networks, flow control management includes buffering incoming traffic. Various buffering schemes in network switches are known in the art. For example, U.S. Pat. No. 6,993,032, whose disclosure is incorporated herein by reference, describes buffering arrangements (e.g., via buffer concatenation) to support differential link distances at full bandwidth.

As another example, U.S. Patent Application Publication 2011/0058571, whose disclosure is incorporated herein by reference, describes a communication apparatus that includes a plurality of switch ports, each including one or more port buffers for buffering data that traverses the switch port. A switch fabric is coupled to transfer the data between the switch ports. A switch control unit is configured to reassign at least one port buffer of a given switch port to buffer a part of the data that does not enter or exit the apparatus via the given switch port, and to cause the switch fabric to forward the part of the data to a destination switch port via the at least one reassigned port buffer.

As yet another example, U.S. Patent Application Publication 2013/0028256, whose disclosure is incorporated herein by reference, describes a method for communication, in a network element that includes multiple ports. The method includes buffering data packets entering the network element via the ports in input buffers that are respectively associated with the ports. Storage of the data packets is shared among the input buffers by evaluating a condition related to the ports, and, when the condition is met, moving at least one data packet from a first input buffer of a first port to a second input buffer of a second port, different from the first port. The buffered data packets are forwarded to selected output ports among the multiple ports.

SUMMARY OF THE INVENTION

An embodiment of the present invention provides a switching apparatus, including multiple ports, each including a respective buffer, and a switch controller. The switch controller is configured to concatenate the buffers of at least an input port and an output port selected from among the multiple ports for buffering traffic of a long-haul link, which is connected to the input port and whose delay exceeds buffering capacity of the buffer of the input port alone, and to carry out end-to-end flow control for the long haul link between the output port and the input port.

In some embodiments, each of the multiple ports further includes respective ingress and egress units, and the switch controller is configured to concatenate a first buffer to a successive second buffer, both selected among the multiple buffers, by directing data from the egress unit of the first port to the ingress unit of the second port. In other embodiments, the switch controller is configured to concatenate the buffers by performing local flow control between successive concatenated buffers. In yet other embodiments, the switch controller is configured to carry out the end-to-end flow control by decreasing a credit count by a first amount of data received at the input port, and increasing the credit count by a second amount of data delivered out of the output port.

In an embodiment, the traffic of the long-haul link is associated with at least first and second Virtual Lanes (VLs), and the switch controller is configured to concatenate the buffers by concatenating first and second subsets of the buffers, selected from among the multiple buffers, for separately buffering each of the respective first and second VLs traffic. In another embodiment, one of the at least first and second VLs includes a high priority VL, and the switch controller is configured to deliver the traffic of the high priority VL from the input port to the output port directly, and to exclude the high priority VL from the end-to-end flow control. In yet another embodiment, the input and output ports belong to a first network switch, and one or more of the multiple ports belong to a second network switch, and the switch controller is configured to concatenate the buffers by concatenating the buffers of at least the input port, the output port and the one or more ports of the second network switch.

In some embodiments, the switch controller is configured to capture an input data count of an amount of data received at the input port and an output data count of an amount of data received at the output port, and to carry out the end-to-end flow control by updating a credit count based on comparison between the captured input data count and output data count. In other embodiments, the switch controller is configured to capture the output data count when receiving at the output port a dedicated packet, which includes the captured input data count and was sent from the input port when the input data count was captured. In yet other embodiments, the traffic of the long-haul link is associated with multiple Virtual Lanes (VLs), and the switch controller is configured to manage each of the input data count, output data count and credit count separately for each of the multiple VLs. In further other embodiments, the end-to-end flow control includes credit-based or pause-based flow control.

There is additionally provided, in accordance with an embodiment of the present invention, a method including concatenating respective buffers of at least an input port and an output port, selected from among multiple ports each including a respective buffer, for buffering traffic of a long-haul link, which is connected to the input port and whose delay exceeds buffering capacity of the buffer of the input port alone. End-to-end flow control for the long haul link is performed between the output port and the input port.

The present invention will be more fully understood from the following detailed description of the embodiments thereof, taken together with the drawings in which:

DETAILED DESCRIPTION OF EMBODIMENTS

Overview

Figure 1:
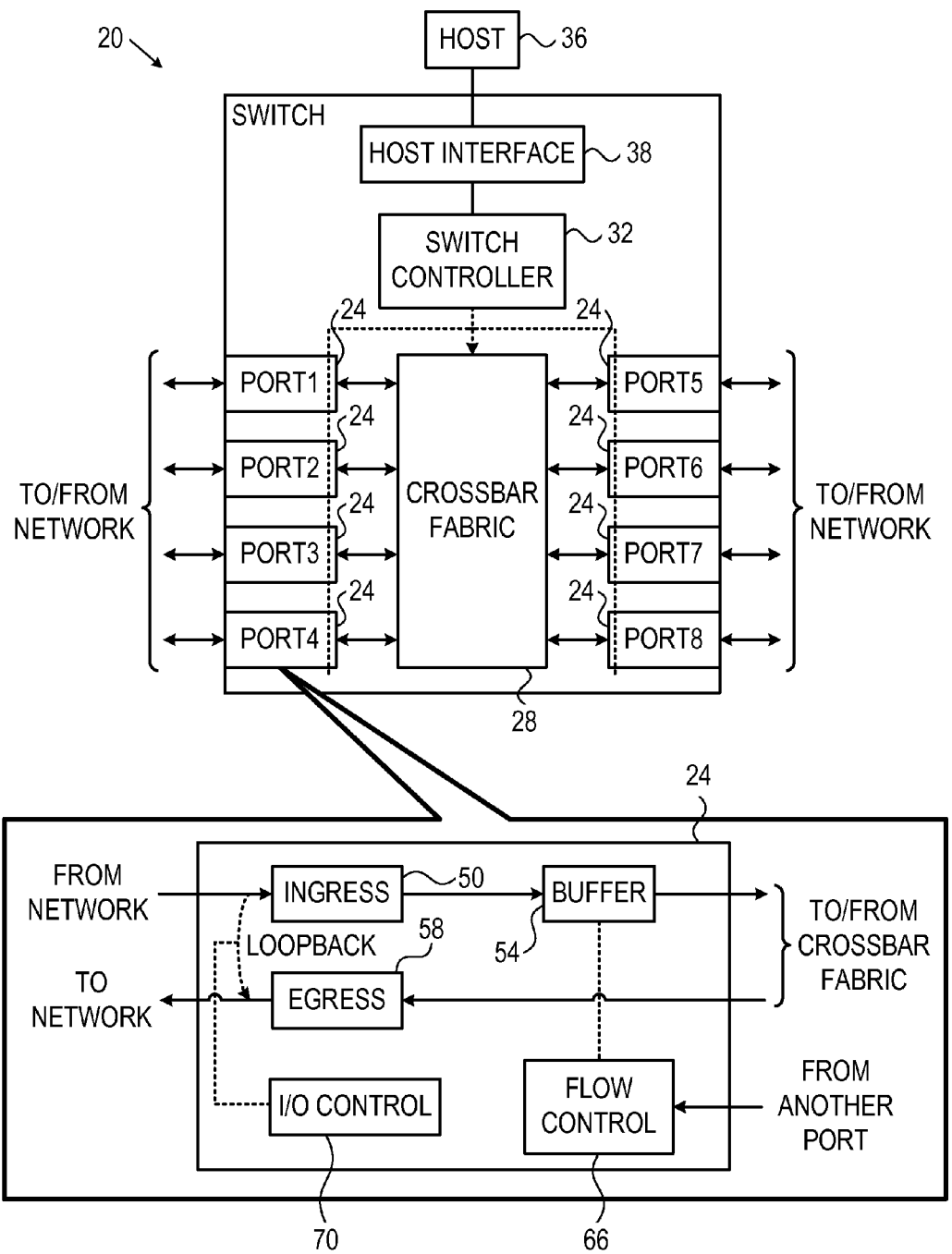
FIG. 1 is a block diagram that schematically illustrates a network switch whose port buffers may be concatenated to support long haul links, in accordance with an embodiment of the present invention.

In some communication networks, switches communicate with one another by sending signals (e.g., electrical or optical signals) over network links that interconnect among the switches. The signals may comprise data and control traffic, including flow control information. A network switch typically comprises multiple ports for receiving data from the network and for delivering data to the network.

A switch port connected to a network link typically comprises a buffer to temporarily store incoming data. As will be explained below, since propagation delay of signals depends on the length of the network link, the size of the buffer should be typically larger for longer links. In some cases, however, it is desirable to connect a port to a link that is longer than the buffering capacity of the respective buffer alone.

Embodiments of the present invention that are described herein provide improved methods and systems for data buffering in network switches that receive data over long haul links. In the disclosed techniques, a network switch comprises multiple ports, each port comprising a buffer. In the description that follows, and in the claims, an input port refers to a port that receives data from the network, and an output port refers to a port that delivers data to the network. We further assume that at least one input port of the switch receives data over a long haul link.

In some embodiments, the rate of data transmission at the sending end is adapted so as not to overfill the buffer at the receiving end. For example, in lossless flow control, such as credit-based flow control, the receiving end or next hop switch signals the amount of free space available in its buffer. As another example, in pause-based (also lossless) flow control, the receiving end or next hop switch signals when the occupancy of its buffer reaches a level higher or lower than certain respective high and low marking levels.

The propagation delay of communication signals along a given link is proportional to the length of the link. For example, the two-way propagation time, or Round Trip Time (RTT) along a 1 Km optical fiber cable, in which light signals travel at a speed of about $2 \cdot 10^8$ meters per second, is about 10 microseconds, and similarly, two milliseconds for a 200 Km cable.

Let BUFFER_SIZE denote the size of the buffer (e.g., given in bits). With credit-based flow control, to fully exploit the bandwidth of the link, the buffer size should exceed RTT·BR bits, wherein BR denotes the data rate over the link (in bits per seconds). For example, when receiving traffic over a 100 Km optical fiber cable, whose bandwidth is 40 Gbps, the size of the receiving buffer should be at least 40 Mbits or 5 MBytes. Under similar conditions, in some embodiments that implement pause-based flow control, the buffer should be larger than 2·RTT·BR bits or 10 MBytes in the last example.

Note that the required buffer size is proportional to the RTT of the link, and therefore also to the length of the link. For a given data rate BR, the receiving buffer size depends on the RTT and can therefore be measured in time units. In the context of the present patent application and in the claims, a long haul link refers to a link whose delay exceeds the receiver buffering capacity, i.e., RTT>BUFFER_SIZE/BR of the individual input port to which the link is connected. Similarly, for a short haul link the relationship RTT<BUFFER_SIZE/BR holds.

The techniques described below disclose various buffering schemes for data sent over a long haul link, and received in a port whose buffer size alone is only sufficient for a short haul link.

In principle, Application Specific Integrated Circuits (ASICs) or semiconductor dies implementing network switches can be designed and manufactured with several different buffer size configurations, each supporting different haul length inputs. Alternatively, a switch die can share multiple internal buffers to support longer haul inputs. This, however, requires more complex internal routing, which increases the size of the die. Further alternatively, the switch may support long haul links using a large buffer external to the switch die. Interfacing, however, with external buffers may require additional hardware that increases the die size.

In some embodiments, the switch concatenates the buffers of at least two of the multiple ports, including the input port and the output port, to create a large enough buffer for the long haul link. To implement concatenation, an egress unit of one buffer delivers data to an ingress unit of the following buffer using internal data loopback and local flow control. Implementing loopback concatenation within a given port requires only small hardware to implement. Additionally, the output port manages end-to-end flow control with the input port within the switch so that the credit count includes the accumulated size of the concatenated buffers.

In other embodiments, the long haul link traffic is associated with multiple different Virtual Lanes (VLs). The switch comprises a check-in buffer that receives the long haul traffic, and a checkout buffer from which the switch sends traffic to the network. For each VL, the switch concatenates one or more buffers among the switch ports to create a respective VL route. The check-in buffer delivers traffic of each VL to its respective VL route, and the checkout buffer receives traffic from all the VL routes to be delivered to the network. The check-in and checkout buffers additionally manage, per VL, internal end-to-end flow control within the switch.

In some embodiments, the concatenation spans buffers that belong to more than one switch. These embodiments are useful, for example, when a single switch does not have a sufficient number of ports whose buffers are available for concatenation. The concatenation of buffers that belong to different switches uses standard port connection and requires no additional interfacing hardware.

When packets traverse a VL route, one of the concatenated buffers may discard a packet for various reasons. Since the checkout buffer is typically unaware of lost packets, it may fail to indicate to the check-in buffer of this lost packet size (e.g., over the internal end-to-end flow control signaling path), and as a result the end-to-end credit count falsely reduces.

In an embodiment, each of the check-in and checkout buffers handles, per VL, an input data count or an output data count, respectively, of the accumulated amount of data that the respective buffer receives for that VL. The check-in buffer captures the VLs input data count status, and sends this status or just the indices of the captured VLs via a dedicated packet (referred to as a "fence" packet) to the checkout buffer over the respective VL route. When the dedicated packet arrives at the checkout buffer, the checkout buffer captures the output data count status of the respective VL and compares the captured output data count status to the input data count status delivered via the dedicated packet. If the two data counts differ, the checkout buffer sends the captured output data count, or the count difference, to the check-in buffer so as to correct the respective end-to-end credit count of the respective VL.

In the disclosed techniques, to support a long haul link connection, a switch concatenates at least input and output port buffers, and possibly additional port buffers of which some may belong to another switch. Implementing the concatenation involves little or no extra interfacing hardware. The input and output ports manage internal flow control so that the concatenated buffers seem to the sending end as a single buffer whose size equals the accumulated size of the concatenated buffers.

System Description

FIG. 1 is a block diagram that schematically illustrates a network switch 20 whose port buffers may be concatenated to support long haul links, in accordance with an embodiment of the present invention. Switch 20 typically connects to other switches or network nodes in some communication network. The switches connect to one another using communication cables that comprise the physical layer upon which the switches establish communication links.

Switch 20 can be part of any suitable communication network and related protocols. For example, the network may comprise a local or a wide area network (WAN/LAN), a wireless network or a combination of such networks, based for example on the geographic locations of the nodes. Additionally, the network may be a packet network such as IP, Infiniband or Ethernet network delivering information at any suitable data rate. The cables connecting between switch ports can be of any suitable type and length according, for example, to the interconnection scheme of the switches in the network. For example, for lengths in the range of 1 Km-200 Km the connecting cables may comprise optical fiber cables that can deliver traffic at data rates in the range between 1 Gbps and 100 Gbps.

Switch 20 comprises multiple ports 24 that can each receive traffic from the network and/or deliver traffic to the network. The network traffic may comprise data chunks of any suitable type and size, such as, for example, data packets in an Infiniband network. In the example of FIG. 1, switch 20 comprises eight ports 24 denoted PORT1 . . . PORT8. In alternative embodiments, however, switch 20 may comprise any other suitable number of ports.

Switch 20 further comprises a crossbar fabric unit 28 that accepts data received by the ports, and delivers the data to the network via the ports according to some (e.g., predefined) routing configuration. A switch controller 32 handles the various management tasks of the switch. In some embodiments, among other tasks, switch controller 32 configures the routing rules in crossbar fabric unit 28, and performs flow control tasks of the switch.

Switch controller 32 communicates with a host 36 via a host interface 38. Typically, a human network administrator (not shown) sends, via host 36, configuration information to switch controller 38, such as routing rules for crossbar fabric unit 28.

The lower part of FIG. 1 depicts a detailed block diagram of port 24. An ingress unit 50 accepts data from the network and buffers the data in a buffer 54, prior to delivering the data to crossbar fabric 28. In the opposite direction, the switch delivers data received from crossbar fabric 28 to the network via an egress unit 58. In some embodiments, ingress unit 50 performs validity checks for incoming packets, such as, for example, validating the Cyclic Redundancy Check (CRC) code in the packet header. When the CRC validation of a given packet fails, ingress unit 50 discards the packet from the buffer. In some embodiments, for example, when a switch concatenates multiple buffers, egress unit 58 may perform packet CRC validation, in addition to ingress unit 50, to detect packets that became damaged while traversing the concatenated buffers.

A flow control unit 66 monitors the occupancy level of buffer 54, and signals flow control information to the sending end by sending respective flow control packets via egress unit 58. In alternative embodiments, flow control unit 66 delivers the monitored occupancy level of buffer 54 to switch controller 32, which manages the flow control signaling accordingly. Flow control 66 in a given port may receive flow control information from another port when managing end-to-end flow control within switch 20.

When employing credit-based flow control, the occupancy level is sometimes represented by credit counts of data units having a given size. For example, in an embodiment, flow control unit 66 comprises at least one credit counter, which is incremented or decremented based on the number of data units that are input to buffer 54 or sent out of buffer 54 (or out of the last concatenated buffer in internal end-to-end flow control, as will be explained below), respectively. In alternative embodiments, at least part of the flow control functionality can be implemented by ingress unit 50 or switch controller 32.

Port 24 further comprises an I/O control unit 70 that controls whether the switch sends data from egress unit 58 to the network, or loops the data back to ingress unit 50. As will be described below, such a loopback configuration may be used for buffer concatenation and requires only little interfacing hardware.

The configuration of switch 20 in FIG. 1 is an example configuration, which is chosen purely for the sake of conceptual clarity. In alternative embodiments, any other suitable switch configuration can also be used. The different elements of switch 20 such as ports 24, crossbar fabric 28, and switch controller 32 may be implemented using any suitable hardware, such as in an Application-Specific Integrated Circuit (ASIC) or Field-Programmable Gate Array (FPGA). In some embodiments, some elements of the switch can be implemented using software, or using a combination of hardware and software elements.

In some embodiments, switch controller 32 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Figure 2:
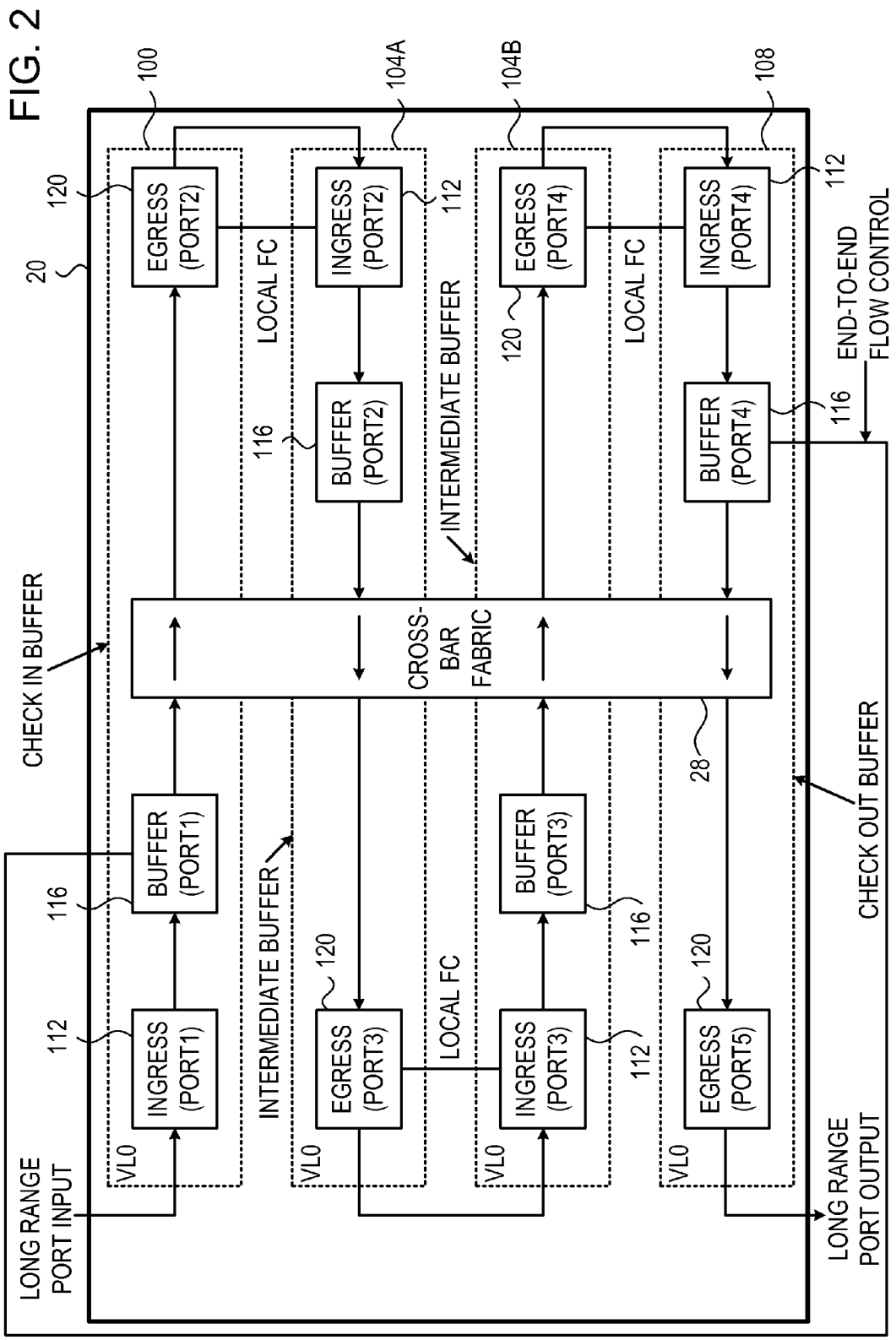
FIG. 2 is a block diagram that schematically illustrates a buffering scheme for a long haul link, in accordance with an embodiment of the present invention.

FIG. 2 is a block diagram that schematically illustrates a buffering scheme for a long haul link, in accordance with an embodiment of the present invention. Switch 20 in FIG. 2 comprises multiple logical buffers marked by dashed lines. The logical buffers include a check-in buffer 100, intermediate buffers 104A and 104B and a checkout buffer 108. Although in the present example switch 20 comprises two intermediate logical buffers, in alternative embodiments the switch may comprise any other suitable number of intermediate buffers, or further alternatively, only check-in and checkout logical buffers.

Each of logical buffers 100, 104 and 108 comprises an ingress unit 112, a buffer 116 and an egress unit 120. Ingress unit 112 accepts input data and stores the data in buffer 116 until the switch forwards the data to egress unit 120. Ingress unit 112, buffer 116 and egress unit 120 can be implemented using respective components 50, 54 and 58 that belong to one or more ports such as port 24 of FIG. 1 above.

In a given logical buffer, the switch routes data buffered in buffer 116 via a crossbar fabric 28 to respective egress unit 120 of the logical buffer. In the buffering scheme of FIG. 2, in logical buffer 100, ingress unit 112 and buffer 116 belong to PORT1 and egress unit 120 to PORT2 of switch 20. The components of the other logical buffers are similarly allocated to PORT2, PORT3 and PORT4. In the present example, egress unit 120 of checkout buffer 108 belongs to PORT5.

Buffer 116 of Check-in buffer 100 buffers data received over a long haul connection. Consequently (as explained above), the buffering capacity of buffer 116 of check-in buffer 100 is smaller than the delay of the long haul link. Switch 20 increases the effective buffering capacity, as seen by the sending switch, by concatenating additional logical buffers to check-in buffer 100.

Switch 20 concatenates logical buffer 104A to logical buffer 100 by routing data output from egress unit 120 of logical buffer 100 into ingress unit 112 of logical buffer 104A. Since in the example of FIG. 2, both egress unit 120 of logical buffer 100 and egress unit 112 of logical buffer 104 belong to PORT2, switch 20 implements the concatenation as a loopback routing configuration that is controlled by I/O control 70, as described above. Switch 20 further similarly concatenates logical buffer 104A, buffer 104B and checkout buffer 108. Egress unit 120 of checkout buffer 108 delivers the buffered data to the network.

Note, that as seen by the sending switch, the effective size of the concatenated buffers equals the sum of the respective individual buffer sizes. Assuming, for example, that buffers 116 share a common size, the buffering scheme in FIG. 2 results in an effective buffer that is four times as large.

In FIG. 2, switch 20 implements logical buffers concatenation by paring ingress unit 112 and egress unit 120 that belong to the same port, i.e., PORT2, PORT3 or PORT4. In addition, each of these pairs performs local flow control between the respective ingress and egress units. For example, ingress unit 112 of logical buffer 104A and egress unit 120 of logical buffer 100, both belong to PORT2, and manage local flow control with one another, e.g., using flow control unit 66. Moreover, the ingress unit of logical buffer 104A is unaware of receiving data directly from egress unit 120 of check-in buffer 100 (rather than from an egress unit of a remote switch.) Therefore, the implementation of local flow control is similar to managing flow control between the ports of separate switches, and therefore requires no additional hardware.

Switch 20 further manages end-to-end flow control between checkout buffer 108 and check-in buffer 100. By implementing internal end-to-end flow control, the switch manages the end-to-end credit count, and the concatenated logical buffers appear as a single buffer to the switch at the sending end of the long haul link. In end-to-end flow control, the credit count typically starts with an occupancy level that equals the accumulated size of the individual sizes of the concatenated buffers. Alternatively, the initial credit may be less than this accumulated size. When the switch stores data in the buffer of check-in buffer 100 or outputs data via the egress unit of checkout buffer 108, the switch respectively decrements or increments the end-to-end credit count, based on the respective amount of data that is buffered or output.

Long Haul Links of Multiple Virtual Lanes

Figure 3:
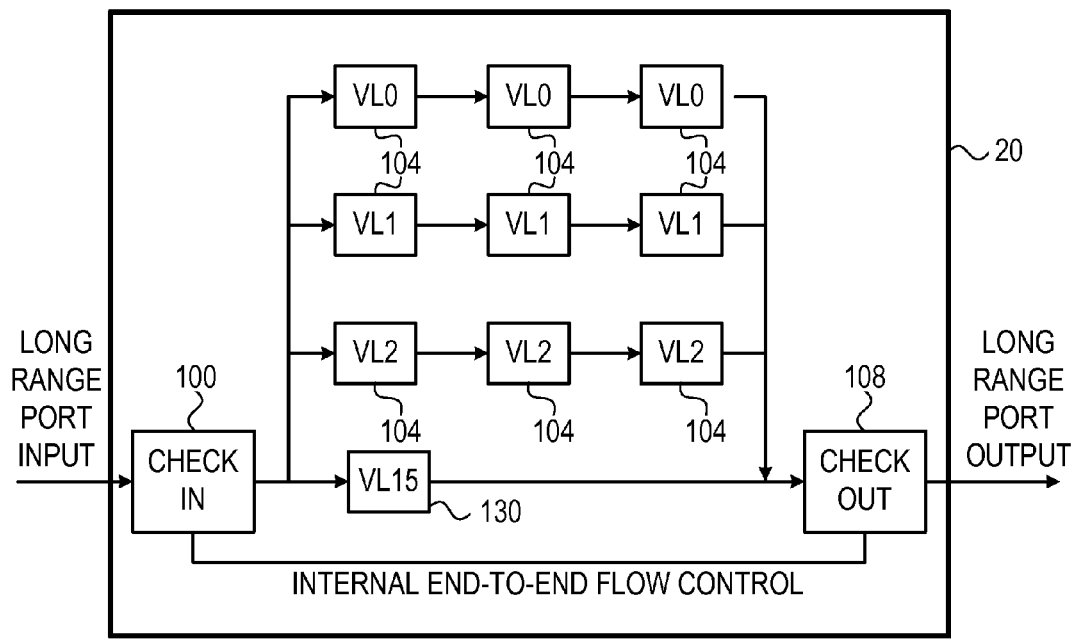
FIG. 3 is a block diagram depicting a buffering scheme for a long haul link that delivers traffic associated with multiple Virtual Lanes (VLs), in accordance with an embodiment of the present invention.

FIG. 3 is a block diagram depicting a buffering scheme for a long haul link that delivers traffic associated with multiple Virtual Lanes (VLs), in accordance with an embodiment of the present invention. In the example of FIG. 3, the long haul input delivers traffic of four Virtual Lanes (VLs) denoted VL0, VL1, VL2 and VL15. In some embodiments, VLs are used to implement differentiated class of service, in which different VLs are assigned different delivery priorities.

Similarly to the previous embodiment, switch 20 of FIG. 3 comprises check-in buffer 100, multiple intermediate buffers 104 and checkout buffer 108. Check-in buffer 100 stores the incoming data of all the VLs in its respective buffer 116. Since the connection rate between two concatenated logical buffers can handle only a single VL simultaneously, the buffering scheme in FIG. 3 concatenates logical buffers for each VL separately. The concatenation of logical buffers can be implemented using data loopback within a given port as described in FIG. 2 above.

The data path along the concatenation of logical buffers 104 allocated for a given VL is referred to herein as a VL route. In the example of FIG. 3, the buffering scheme comprises VL routes for VL0, VL1 and VL2, each VL route concatenates three logical buffers 104. When check-in buffer 100 forwards data from its buffer, it checks to which of the VLs the data belongs and sends the data to the respective VL route.

Checkout buffer 108 receives data from all the VL routes and stores the data in its buffer prior to delivery of the data to the network. Checkout buffer 108 and check-in buffer 100 manage internal end-to-end flow control as described above. Switch 20 can manage the end-to-end flow control and credit counts per each VL separately, or manage a single credit count for all the VLs collectively.

In some embodiments, switch 20 receives high priority data over a dedicated VL denoted VL15. VL15 has higher delivery priority compared to the other VLs, and may be used, for example, for the delivery of management traffic. The delivery of VL15 data is considered as lossy delivery (i.e., a receiving end is allowed to discard packets if its buffer is full), and therefore switch 20 does not manage flow control for VL15 traffic. The buffering scheme in FIG. 3 includes a high priority data path 130 for VL15.

Unlike logical buffers 104, data path 130 typically does not comprise buffering means. When check-in buffer 100 identifies data that belongs to VL15, it sends this data to check-out buffer 108 immediately, or with priority higher than the other VLs. Additionally, check-out buffer 108 delivers VL15 data to the network at priority higher than the other VLs. Since the delivery of VL15 data is immediate, the VL15 data is excluded from the internal end-to-end flow control management.

Figure 4:
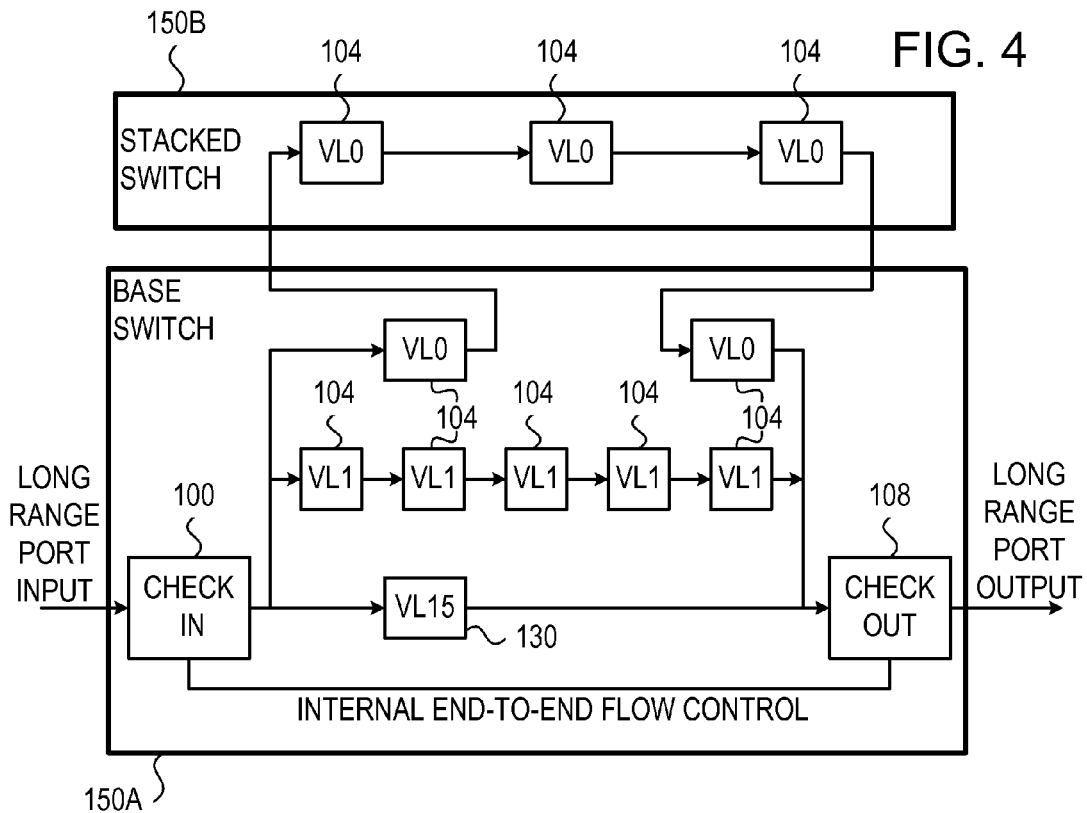
FIG. 4 is a block diagram depicting a buffering scheme in which concatenating buffers in a switch, to support a long haul link, includes at least one buffer that belongs to another switch.

FIG. 4 is a block diagram depicting a buffering scheme in which concatenating buffers in a switch, to support a long haul link, includes at least one buffer that belongs to another switch. The buffering scheme in FIG. 4 comprises a base switch 150A and a stacked switch 150B. Base switch 150A receives multi-VL data over a long haul link. In the example of FIG. 4, the multi-VL data comprises VL0 and VL1, which have normal delivery priority, and VL15 that has high delivery priority. For VL1 and VL15 the buffering scheme is similar to the one described in FIG. 3 above.

In the example of FIG. 4, the VL0 and VL1 routes comprise five logical buffers 104. In some cases, the number of logical buffers in base switch 150A that are available for concatenation is insufficient. For example, the switch may receive data from many different sources. As another example, the long haul input may comprise a large number of VLs possibly delivering data at high rates. In the buffering scheme of FIG. 4, three of the five concatenated buffers 104 for VL0 belong to stacked switch 150B. Concatenating between the base and stacked switches is done using standard port connections and requires no additional interfacing means. The check-in and checkout units of switch 150A that sends the data over the long haul link are unaware, however, of sharing buffering resources with the stacked switch.

In some embodiments, base switch 150A concatenates to buffers of multiple stacked switches. For example, in a stacked-over-stacked architecture, a given VL route in the base switch shares concatenated buffers of a stacked switch, of which at least one buffer belongs to yet another stacked switch. For example, in FIG. 4, the middle buffer in stacked switch 150B may belong to an additional stacked switch (not shown).

The concatenation configuration in FIG. 4 is exemplary, and any other suitable concatenation configuration can also be used. For example, although in the embodiment of FIG. 4 only VL0 shares concatenated buffers of a stacked switch, in alternative embodiments, two or more VL routes can share buffers with external stacked switches. As another example, a single VL route in the base switch may concatenate to buffers that belong to two or more different stacked switches, which are concatenated serially with one another.

End-to-End Flow Control Considering Lost Packets

Data units or packets that transverse the switch may become damaged and discarded via CRC validation. For example, radioactive atoms in the material of the die may decay and release alpha particles that when hitting a memory cell can change the data value stored in that cell. The probability of packet loss increases when concatenating multiple buffers, and in particular when concatenated buffers belong to an external switch.

When the check-in buffer sends a packet to a VL route the credit count decreases by the packet size. If one of the VL route buffers discards the packet, the checkout buffer, which will fail to report to the check-in buffer of delivering the delivery of packet to the network and the check-in buffer will not increases the end-to-end credit count back by the size of the lost packet. Recurring events of packet loss cause the credit count to further decrease.

Figure 5:
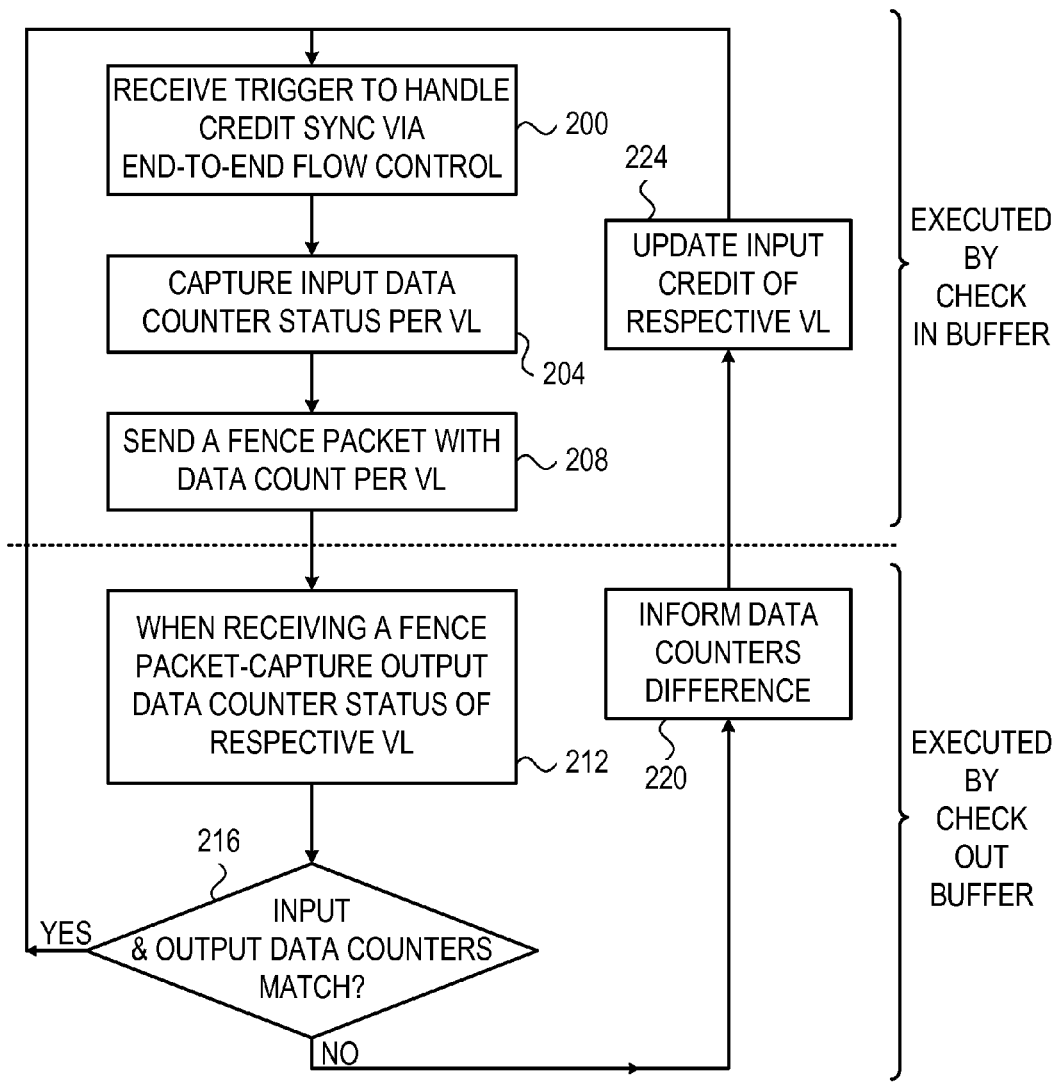
FIG. 5 is a flow chart that schematically illustrates a method for internal end-to-end credit correction by synchronizing between data counts within a network switch, in accordance with an embodiment of the present invention.

FIG. 5 is a flow chart that schematically illustrates a method for internal end-to-end credit correction by synchronizing between data counts within a network switch, in accordance with an embodiment of the present invention. The method of FIG. 5 can be executed by switches that receive multi-VL data over a long haul link, and that implement, for example, one of the buffering configurations described in FIGS. 2-4 above. The method is described for a switch whose check-in buffer holds an credit count per VL. The method further assumes that each of the check-in and checkout buffers comprises a respective input and output data counter that counts the amount of data received at its ingress unit or buffer per VL.

The method begins with check-in buffer 100 receiving an instruction to start end-to-end credit count synchronization, at a triggering step 200. In response to receiving the trigger, check-in buffer 100 captures the input data counter status for each of the VLs having concatenated buffers, at a capturing step 204. Check-in buffer 100 may receive the trigger with any suitable timing, such as, for example, periodically. At a fence packet sending step 208, check-in buffer 100 sends a dedicated fence packet that includes the respective input credits to each of the VL routes (or just the indices of the VLs) for which the input data counter was captured. Check-in buffer 100 can send a common dedicated packet that includes all the respective VLs, or send separate packets per VL route.

When a fence packet that was sent via a given VL route arrives at checkout buffer 108, the checkout buffer captures the output data counter status of that VL, at an output counter capture step 212. The dedicated packets sent over the different VL routes typically arrive at the checkout buffer at different times.

At a comparison step 216, checkout buffer 108 compares between the input data counter status captured at step 204 and the output data counter status captured at step 212. If the two data counters differ, at least one packet was lost, and the check-out buffer informs the check-in buffer of the count difference at an informing step 220. Checkout buffer 108 can send the count difference value to check-in buffer 100, for example, via switch controller 32. In alternative embodiments, at step 220 the checkout buffer sends to the check-in buffer the output data count status, and the check-in buffer calculates the data count difference. In such embodiments checkout buffer may skip step 216.

At a credit updating step 224, check-in buffer 100 updates the input credit of the respective VL based on (e.g., by adding or subtracting) the informed count difference. Following step 224, or when the data counters match at step 216, the method loops back to step 200 to wait for subsequent triggers.

The example buffering schemes described above are chosen purely for the sake of conceptual clarity. In alternative embodiments, any other suitable buffering schemes for supporting a long haul link can also be used. For example, although the description above mainly refers to credit-based flow control, the disclosed techniques are applicable to pause-based flow control as well.

As a another example, although in the description above the check-in and check-out buffers manage the internal end-to-end flow control, in alternative embodiments, at least some of the flow control functionality may be carried out by the switch controller.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A switching apparatus, comprising:
   multiple ports, each comprising a respective buffer; and
   a switch controller, which is configured to concatenate the buffers of at least an input port and an output port selected from among the multiple ports for buffering traffic of a long-haul link, which is connected to the input port and whose delay exceeds buffering capacity of the buffer of the input port alone, and to carry out end-to-end flow control for the long haul link between the output port and the input port, by capturing an input data count of an amount of data received at the input port, and when receiving at the output port a dedicated packet, which includes the captured input data count and was sent from the input port when the input data count was captured, further capturing an output data count of an amount of data received at the output port, and updating a credit count based on comparison between the captured input data count and output data count.

2. The switching apparatus according to claim 1, wherein each of the multiple ports further comprises respective ingress and egress units, and wherein the switch controller is configured to concatenate a first buffer to a successive second buffer, both selected among the multiple buffers, by directing data from the egress unit of the first port to the ingress unit of the second port.

3. The switching apparatus according to claim 1, wherein the switch controller is configured to concatenate the buffers by performing local flow control between successive concatenated buffers.

4. The switching apparatus according to claim 1, wherein the switch controller is configured to carry out the end-to-end flow control by decreasing a credit count by a first amount of data received at the input port, and increasing the credit count by a second amount of data delivered out of the output port.

5. The switching apparatus according to claim 1, wherein the traffic of the long-haul link is associated with at least first and second Virtual Lanes (VLs), and wherein the switch controller is configured to concatenate the buffers by concatenating first and second subsets of the buffers, selected from among the multiple buffers, for separately buffering each of the respective first and second VLs traffic.

6. The switching apparatus according to claim 5, wherein one of the at least first and second VLs comprises a high priority VL, and wherein the switch controller is configured to deliver the traffic of the high priority VL from the input port to the output port directly, and to exclude the high priority VL from the end-to-end flow control.

7. The switching apparatus according to claim 1, wherein the input and output ports belong to a first network switch, wherein one or more of the multiple ports belong to a second network switch, and wherein the switch controller is configured to concatenate the buffers by concatenating the buffers of at least the input port, the output port and the one or more ports of the second network switch.

8. A switching apparatus, comprising:
multiple ports, each comprising a respective buffer; and
a switch controller, which is configured to concatenate the buffers of at least an input port and an output port selected from among the multiple ports for buffering traffic of a long-haul link, which is associated with multiple Virtual Lanes (VLs) and is connected to the input port and whose delay exceeds buffering capacity of the buffer of the input port alone, and to carry out end-to-end flow control for the long haul link between the output port and the input port, by capturing an input data count of an amount of data received at the input port, capturing an output data count of an amount of data received at the output port, updating a credit count based on comparison between the captured input data count and output data count, and managing each of the input data count, output data count and credit count separately for each of the multiple VLs.

9. The switching apparatus according to claim 1, wherein the end-to-end flow control comprises credit-based or pause-based flow control.

10. A method, comprising:
concatenating respective buffers of at least an input port and an output port, selected from among multiple ports each comprising a respective buffer, for buffering traffic of a long-haul link, which is connected to the input port and whose delay exceeds buffering capacity of the buffer of the input port alone; and
performing end-to-end flow control for the long haul link between the output port and the input port, by capturing an input data count of an amount of data received at the input port, and when receiving at the output port a dedicated packet, which includes the captured input data count and was sent from the input port when the input data count was captured, further capturing an output data count of an amount of data received at the output port, and updating a credit count based on comparison between the input data count and the output data count.

11. The method according to claim 10, wherein each of the multiple ports further comprises respective ingress and egress units, and wherein concatenating the buffers comprises concatenating a first buffer to a successive second buffer, both selected among the multiple buffers, by directing data from the egress unit of the first port to the ingress unit of the second port.

12. The method according to claim 10, wherein concatenating the buffers comprises performing local flow control between successive concatenated buffers.

13. The method according to claim 10, wherein performing the end-to-end flow control comprises decreasing a credit count by a first amount of data received at the input port, and increasing the credit count by a second amount of data delivered out of the output port.

14. The method according to claim 10, wherein the traffic of the long-haul link is associated with at least first and second Virtual Lanes (VLs), and wherein concatenating the buffers comprises concatenating first and second subsets of the buffers, selected from among the multiple buffers, for separately buffering each of the respective first and second VLs traffic.

15. The method according to claim 14, wherein one of the at least first and second VLs comprises a high priority VL, and wherein concatenating the buffers comprises delivering the traffic of the high priority VL from the input port to the output port directly, and excluding the high priority VL from the end-to-end flow control.

16. The method according to claim 10, wherein the input and output ports belong to a first network switch, wherein one or more of the multiple ports belong to a second network switch, and wherein concatenating the buffers comprises concatenating the buffers of at least the input port, the output port and the one or more ports of the second network switch.

17. The method according to claim 10, wherein performing the end-to-end flow control comprises performing credit-based or pause-based flow control.

18. A method, comprising:
concatenating respective buffers of at least an input port and an output port, selected from among multiple ports each comprising a respective buffer, for buffering traffic of a long-haul link, which is associated with multiple Virtual Lanes (VLs), is connected to the input port, and whose delay exceeds buffering capacity of the buffer of the input port alone; and
performing end-to-end flow control for the long haul link between the output port and the input port, by updating a credit count based on comparison between a captured input data count of an amount of data received at the input port and an output data count of an amount of data received at the output port, and managing each of the input data count, output data count and credit count separately for each of the multiple VLs.

* * * * *